(12) United States Patent
Ge et al.

(10) Patent No.: US 12,553,973 B2
(45) Date of Patent: Feb. 17, 2026

(54) MAGNETIC RESONANCE SYSTEM, MAGNETIC RESONANCE IMAGE CORRECTION METHOD, AND MAGNETIC RESONANCE IMAGING METHOD

(71) Applicant: GE Precision Healthcare LLC, Waukesha, WI (US)

(72) Inventors: Yaan Ge, Beijing (CN); Liyuan Jin, Beijing (CN); Kun Wang, Beijing (CN); Qingyu Dai, Beijing (CN); Shan Gao, Beijing (CN)

(73) Assignee: GE Precision Healthcare LLC, Waukesha, WI (US)

( * ) Notice: Subject to any disclaimer, the term of this patent is extended or adjusted under 35 U.S.C. 154(b) by 336 days.

(21) Appl. No.: 18/529,200

(22) Filed: Dec. 5, 2023

(65) Prior Publication Data

US 2024/0183921 A1 Jun. 6, 2024

(30) Foreign Application Priority Data

Dec. 6, 2022 (CN) .......................... 202211553540.3

(51) Int. Cl.
*G01R 33/56* (2006.01)
*G01R 33/385* (2006.01)
*G06T 11/00* (2006.01)

(52) U.S. Cl.
CPC ....... *G01R 33/5608* (2013.01); *G01R 33/385* (2013.01); *G06T 11/005* (2013.01)

(58) Field of Classification Search
CPC .. G01R 33/385; G01R 33/5608; G06T 11/005
See application file for complete search history.

(56) References Cited

U.S. PATENT DOCUMENTS

| | | | |
|---|---|---|---|
| 10,302,731 B2 * | 5/2019 | Trzasko | G01R 33/58 |
| 10,444,317 B2 * | 10/2019 | Tamada | G01R 33/4824 |
| 10,663,550 B2 * | 5/2020 | Feiweier | G01R 33/56572 |
| 11,215,683 B2 | 1/2022 | Feiweier | |

* cited by examiner

*Primary Examiner* — Gregory H Curran (57) ABSTRACT

Embodiments of the present invention disclose a magnetic resonance system, a magnetic resonance image correction method, and a magnetic resonance imaging method. The magnetic resonance image correction method comprises: separately obtaining main magnetic field intensity distribution information and gradient magnetic field information of a magnetic resonance system, the gradient magnetic field information comprising one or more among X-axis gradient magnetic field information, Y-axis gradient magnetic field information, and Z-axis gradient magnetic field information; obtaining a first correction coefficient based on the main magnetic field intensity distribution information; obtaining, based on one or more among the X-axis gradient magnetic field information, the Y-axis gradient magnetic field information, and the Z-axis gradient magnetic field information, one or more corresponding second correction coefficients; and, correcting image data obtained by means of the magnetic resonance system based on the first correction coefficient and the one or more second correction coefficients.

18 Claims, 9 Drawing Sheets

MAGNETIC RESONANCE SYSTEM, MAGNETIC RESONANCE IMAGE CORRECTION METHOD, AND MAGNETIC RESONANCE IMAGING METHOD

CROSS REFERENCE TO RELATED APPLICATIONS

The present application claims priority and benefit of Chinese Patent Application No. 202211553540.3 filed on Dec. 6, 2022, which is incorporated herein by reference in its entirety.

TECHNICAL FIELD

Embodiments of the present invention generally relate to medical imaging technology, and in particular to a magnetic resonance (MR) system, a magnetic resonance image correction method, and a magnetic resonance imaging method.

BACKGROUND

Magnetic resonance imaging (MRI), as a medical imaging modality, can obtain images of the human body without using X-rays or other ionizing radiation. MRI utilizes a magnet having a strong magnetic field to generate a main magnetic field B0. When a part to be imaged of the human body is positioned in the main magnetic field B0, nuclear spins associated with hydrogen nuclei in human tissue are polarized, so that the tissue of the part to be imaged generates a longitudinal magnetization vector at a macroscopic level. After a radio-frequency field B1 intersecting the direction of the main magnetic field B0 is applied, the direction of rotation of protons changes so that the tissue of the part to be imaged generates a transverse magnetization vector at a macroscopic level. After the radio-frequency field B1 is removed, the transverse magnetization vector decays in a spiral manner until it is restored to zero. A free induction decay signal is generated during decay. The free induction decay signal can be acquired as a magnetic resonance signal, and a tissue image of the part to be imaged can be reconstructed based on the acquired signal.

A gradient system is configured to transmit a layer selection gradient pulse, a phase-encoding gradient pulse, and a frequency-encoding gradient pulse (also referred to as a read-out gradient pulse) to provide three-dimensional position information for the aforementioned magnetic resonance signal to implement image reconstruction. That is, the MRI system performs spatial-position encoding on the magnetic resonance signal by using a gradient magnetic field superimposed on the main magnetic field. Typically, a desired gradient magnetic field is linear. However, the linearity of an actually generated gradient magnetic field often deviates from the desired linearity, which may cause image distortion.

In the prior art, linearity compensation or correction on a gradient magnetic field may improve the problem of image distortion. However, it is desirable to further improve the effect of image correction, so as to improve the problem of image distortion to a greater extent.

SUMMARY

An aspect of the present invention provides a magnetic resonance image correction method, comprising: separately obtaining main magnetic field intensity distribution information and gradient magnetic field information of a magnetic resonance system, the gradient magnetic field information comprising one or more among X-axis gradient magnetic field information, Y-axis gradient magnetic field information, and Z-axis gradient magnetic field information; obtaining a first correction coefficient based on the main magnetic field intensity distribution information; obtaining, based on one or more among the X-axis gradient magnetic field information, the Y-axis gradient magnetic field information, and the Z-axis gradient magnetic field information, one or more corresponding second correction coefficients; and correcting image data obtained by means of the magnetic resonance system based on the first correction coefficient and the one or more second correction coefficients.

Another aspect of the present invention provides a magnetic resonance imaging method, comprising: scanning a scan subject by means of a magnetic resonance system to obtain raw image data; obtaining a pre-stored first correction coefficient and one or more second correction coefficients, the first correction coefficient being obtained based on main magnetic field intensity distribution information of the magnetic resonance system, and the one or more second correction coefficients being obtained based on one or more among X-axis gradient magnetic field information, Y-axis gradient magnetic field information, or Z-axis gradient magnetic field information of the magnetic resonance system, respectively; correcting the raw image data based on the first correction coefficient and the one or more second correction coefficients; and, performing image reconstruction based on the corrected image data.

Another aspect of the present invention provides a magnetic resonance system, comprising: a main magnet for generating a main magnetic field; a gradient coil for generating a gradient magnetic field superimposed on the main magnetic field; and a processor for performing the magnetic resonance image correction method or the magnetic resonance imaging method of any of the above aspects.

BRIEF DESCRIPTION OF THE DRAWINGS

The described and other features, aspects, and advantages of the present invention will be better understood once the following detailed description has been read with reference to the accompanying drawings. In the accompanying drawings, the same reference signs are used to represent the same components throughout the accompanying drawings, in which.

DETAILED DESCRIPTION

Specific embodiments of the present invention will be described in detail below with reference to the accompanying drawings in order to assist those skilled in the art to understand exactly the subject matter set forth in the present invention. In the following detailed description of the following specific embodiments, the present specification does not describe in detail any known functions or configurations to prevent unnecessary details from affecting the disclosure of the present invention.

Unless otherwise defined, the technical or scientific terms used in the claims and the description should be as they are usually understood by those possessing ordinary skill in the technical field to which they belong. Terms such as "first", "second" and similar terms used in the present description and claims do not denote any order, quantity, or importance, but are only intended to distinguish different constituents. The terms "one" or "a/an" and similar terms do not express a limitation of quantity, but rather that at least one is present. The terms "include" or "comprise" and similar words indicate that an element or object preceding the terms "include" or "comprise" encompasses elements or objects and equivalent elements thereof listed after the terms "include" or "comprise", and do not exclude other elements or objects. The terms "connect" or "link" and similar words are not limited to physical or mechanical connections, and are not limited to direct or indirect connections. Furthermore, it should be understood that references to "an embodiment" or "embodiments" of the present disclosure are not intended to be construed as excluding the existence of additional implementations that also incorporate the referenced features.

A "module", "unit", etc., as described herein may be implemented by using software, hardware, or a combination of software and hardware. For example, in accordance with some aspects of the embodiments of the present invention, the "modules" described herein may be implemented as computer program modules or circuit modules.

An "image" described herein may include a displayed image, or may include data that forms the displayed image.

Figure 1:
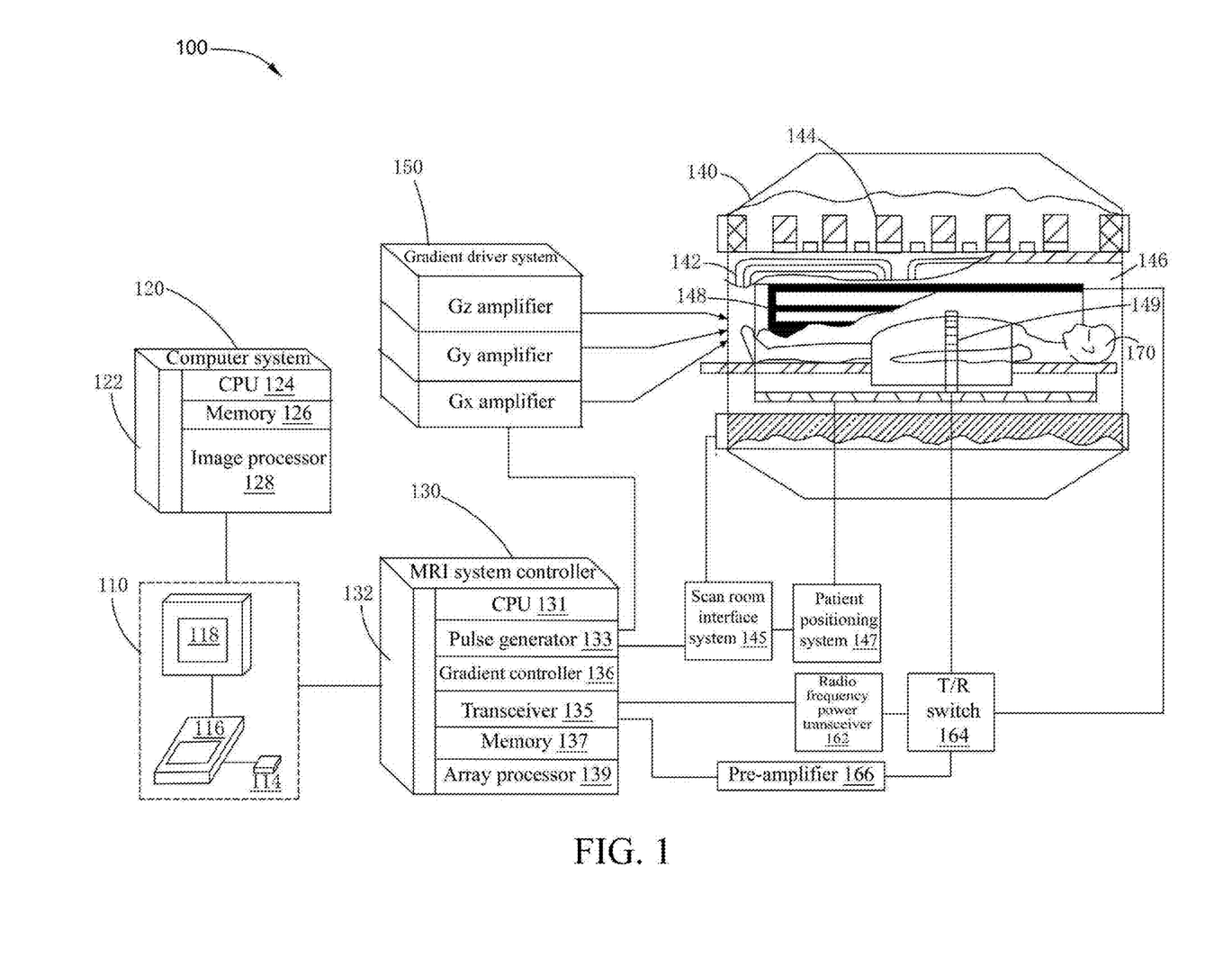
FIG. 1 illustrates an exemplary magnetic resonance (MR) system 100 according to some embodiments of the present invention.

Referring to FIG. 1, an exemplary magnetic resonance (MR) system 100 according to some embodiments of the present invention is illustrated. An operator workstation 110 is used to control the operation of the MR system 100, the operator workstation 110 including an input apparatus 114, a control panel 116, and a display 118. The input apparatus 114 may be a joystick, a keyboard, a mouse, a trackball, a touch-activated screen, voice control, or any similar or equivalent input apparatus. The control panel 116 may include a keyboard, a touch-activated screen, voice control, a button, a slider, or any similar or equivalent control apparatus. The operator workstation 110 is coupled to and communicates with a computer system 120, and provides an interface to allow an operator to plan a magnetic resonance scan, display an image, perform image processing, and store data and images.

The computer system 120 includes a plurality of modules that communicate with one another by means of an electrical and/or data connection module 122. The connection module 122 may be a wired communication link, an optical fiber communication link, a wireless communication link, and the like. The computer system 120 may include a central processing unit (CPU) 124, a memory 126, and an image processor 128. In some embodiments, the image processor 128 may be replaced by an image processing function run in the CPU 124. The computer system 120 may be connected to an archive media apparatus, a persistent or backup memory, or a network. The computer system 120 may be coupled to and communicates with a separate MR system controller 130.

The MR system controller 130 includes a set of modules that communicate with one another by means of an electrical and/or data connection module 132. The connection module 132 may be a direct wired communication link, an optical fiber communication link, a wireless communication link, and the like. In an alternative embodiment, modules of the computer system 120 and the MR system controller 130 may be implemented on the same computer system or on a plurality of computer systems. The MR system controller 130 may include a CPU 131, a sequence pulse generator 133 that communicates with the operator workstation 110, a transceiver (or an RF transceiver) 135, a gradient controller 136, a memory 137, and an array processor 139.

A subject 170 of an MR scan may be positioned within a cylindrical imaging volume 146 of a magnetic resonance assembly 140 by means of a scanning table. The MR system controller 130 controls the scanning table to travel in a Z-axis direction of the magnetic resonance system so as to transport the subject 170 into the imaging volume 146. The magnetic resonance assembly 140 includes a superconducting magnet having a superconducting coil 144, a radio frequency (RF) coil assembly, and a gradient coil assembly 142. The superconducting coil 144 has a magnet aperture to form the cylindrical imaging volume. The superconducting coil 144 provides a static uniform longitudinal magnetic field, i.e., a main magnetic field $B_0$, through the cylindrical imaging volume 146 during operation.

Specifically, the gradient coil assembly 142 may include an X-axis gradient coil, a Y-axis gradient coil, and a Z-axis gradient coil. Each of the three gradient coils generates a gradient magnetic field inclined to one among three spatial axes (e.g., X-axis, Y-axis, and Z-axis) that are perpendicular to one another, and generates a gradient field in each among a slice-selection-encoding direction, a phase-encoding direction, and a frequency-encoding direction according to imaging conditions. The gradient coil assembly 142 applies a gradient field in the slice-selection-encoding direction of the subject 170 so as to select a slice (layer) for imaging. The gradient coil assembly 142 also applies a gradient field in the phase-encoding direction of the subject 170 so as to perform phase-encoding on a magnetic resonance signal of an excited slice. The gradient coil system 142 then applies a gradient field in the frequency-encoding direction of the subject 170 so as to perform frequency-encoding on the magnetic resonance signal of the excited slice. The selected slice or layer may be any plane in space, for example, may be in parallel to, perpendicular to, or inclined relative to any spatial axis.

The radio frequency coil assembly may include a body coil 148 and a surface coil 149, and may be used to send and/or receive a radio frequency signal. Specifically, a radio frequency transmit coil transmits a radio-frequency excitation pulse to the selected slice of the subject 170 and excites the slice.

The MR system controller 130 may receive a command from the operator workstation 110 to indicate an MRI scan sequence that is to be executed during the MRI scan. The "scan sequence" above refers to a combination of pulses that have specific intensities, shapes, time sequences, and the like and that are applied when a magnetic resonance imaging scan is executed. The pulses may typically include, for example, a radio frequency pulse and a gradient pulse. A plurality of scan sequences may be pre-stored in the computer system 120, so that a sequence suitable for clinical examination requirements can be indicated by means of the operator workstation. The clinical examination requirements may include, for example, an imaging site, an imaging function, an imaging effect, scanning safety and the like. The sequence pulse generator 133 of the MR system controller 130 sends, on the basis of the indicated sequence, an instruction describing the time sequences, intensities, and shapes of the radio frequency pulse and gradient pulse in the sequence so as to operate a system component that executes the sequence.

The radio frequency pulse in the scan sequence sent by the sequence pulse generator 133 may be generated by the transceiver 135, and the radio frequency pulse is amplified by a radio frequency power amplifier 162. When a toggle switch 141 is toggled to the body coil 148, the amplified radio frequency pulse is provided to the body coil 148 by means of a transmit/receive switch (T/R switch) 164, and the RF body coil 148 then provides a transverse magnetic field, i.e., a radio frequency field $B_1$. The radio frequency field $B_1$ is substantially perpendicular to $B_0$ throughout the entire cylindrical imaging volume 146. The transverse magnetic field is used to excite stimulated nuclei in the body of the scan subject so as to generate an MR signal.

The gradient pulse in the scan sequence sent by the sequence pulse generator 133 may be generated by means of the gradient controller 136 and acts on a gradient driver 150. The gradient driver 150 includes $G_x$, $G_y$, and $G_z$ amplifiers, and the like. Each among the $G_x$, $G_y$, and $G_z$ gradient amplifiers is used to excite a corresponding gradient coil in the gradient coil assembly 142 so as to generate a gradient magnetic field used to spatially encode an MR signal during an MR scan.

The sequence pulse generator 133 is coupled to and communicates with a scan room interface system 145, and the scan room interface system 145 receives signals from various sensors associated with the state of the magnetic resonance assembly 140 and various processors provided in a scan room. The scan room interface system 145 is further coupled to and communicates with a patient positioning system 147, the patient positioning system 147 sending and receiving a signal to control the scanning table to travel so as to transport the patient or the subject 170 to a desired position to perform the MR scan.

As described above, the RF body coil 148 and the RF surface coil 149 may be used to transmit a radio frequency pulse and/or receive MR signals from the scan subject. The MR signals emitted by excited nuclei in the body of the scan subject may be sensed and received by the RF body coil 148 or the RF surface coil 149 and then sent back to a preamplifier 166 by means of the T/R switch 164. The T/R switch 164 may be controlled by a signal from the MR system controller 130 to electrically connect, during a transmit mode, the radio frequency power amplifier 162 to the RF body coil 148 and to connect, during a receive mode, the preamplifier 166 to the RF body coil 148. The T/R switch 164 may further enable the RF surface coil 149 to be used in the transmit mode or the receive mode.

In some embodiments, the MR signals sensed and received by the RF body coil 148 or the RF surface coil 149 and amplified by the preamplifier 166 are demodulated, filtered, and digitized in a receiving portion of the transceiver 135, and transmitted as a raw k-space data array to the memory 137 in the MR system controller 130.

A reconstructed magnetic resonance image may be obtained by transforming/processing the stored raw k-space data. For each image to be reconstructed, the data is rearranged into separate k-space data arrays, and each of said separate k-space data arrays is inputted to the array processor 139, the array processor being operated to transform the data into an array of image data by Fourier transform.

The array processor 139 uses transform methods, most commonly Fourier transform, to create images from the received MR signals. These images are transmitted to the computer system 120 and stored in the memory 126. In response to commands received from the operator workstation 110, the image data may be stored in a long-term memory, or may be further processed by the image processor 128 and transmitted to the operator workstation 110 for presentation on the display 118.

In various embodiments, components of the computer system 120 and MR system controller 130 may be implemented on the same computer system or on a plurality of computer systems. It should be understood that the MR system 100 shown in FIG. 1 is intended for illustration. Suitable MR systems may include more, fewer, and/or different components.

The MR system controller 130 and the image processor 128 may separately or collectively include a computer processor and a storage medium. The storage medium records a program for predetermined data processing that is to be executed by the computer processor. For example, the storage medium may store a program used to implement scanning processing (such as a scan flow and an imaging sequence), image reconstruction, image processing, and the like. Specifically, the storage medium may store the magnetic resonance image correction method or the magnetic resonance imaging method of any of the embodiments of the present invention. The computer processor of the MR system controller 130 or processor 128 may be used to perform the above methods of the present invention. The described storage medium may include, for example, a ROM, a floppy disk, a hard disk, an optical disk, a magneto-optical disk, a CD-ROM, or a non-volatile memory card.

There may be geometric aberration or geometric distortion in a reconstructed image based on raw image data, which may be caused by a variety of reasons, such as the non-linearity of the gradient, the non-uniformity of the remaining main magnetic field after shimming of the main magnetic field, a physical perturbation of the subject under examination. In the prior art, geometric distortion caused by the gradient field may be corrected, wherein the shift of each pixel is calculated and shift correction is performed accordingly. The non-uniformity of the remaining main magnetic field is minimized and not corrected. However, after active shimming, the non-uniformity of the remaining magnetic field may still result in the geometric distortion of the image, particularly for a larger field of view (FOV) and a smaller signal acquisition bandwidth.

In embodiments of the present invention, correcting the geometric distortions from a variety of different causes and fusing the corrections into the same correction model can improve different types rather than a single type of geometric distortion, enabling image aberration/distortion/warping, etc, to be reduced to a greater extent.

Figure 2:
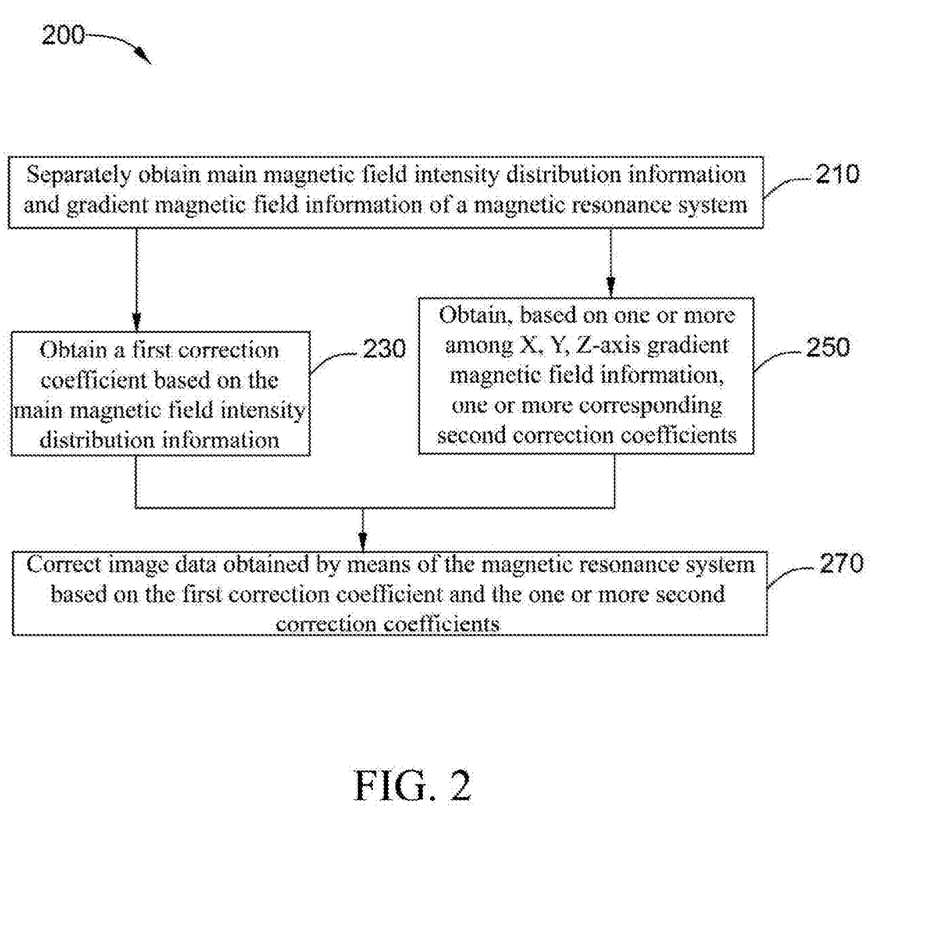
FIG. 2 illustrates a flowchart 200 of a magnetic resonance image correction method of an embodiment of the present invention.

Referring to FIG. 2, a flowchart 200 of a magnetic resonance image correction method of an embodiment of the present invention is illustrated. In step 210, main magnetic field intensity distribution information and gradient magnetic field information of a magnetic resonance system are separately obtained, the gradient magnetic field information including one or more among X-axis gradient information, Y-axis gradient information, and Z-axis gradient information. The main magnetic field intensity distribution information may be distribution values of main magnetic field intensity of the current magnetic resonance system at different locations, which may represent the uniformity of the main magnetic field. The gradient magnetic field information includes the linearity of a gradient coil of the current magnetic resonance system. The main magnetic field intensity distribution information and the gradient magnetic field information may be obtained and stored in the magnetic resonance system in advance, so that the same can be retrieved when performing step 210. For example, the information may be obtained when performing system correction, for example, by scanning a die body for shimming when performing the system correction, and calculating the main magnetic field intensity distribution information based on obtained images, or by using a magnetic field detection apparatus (such as a magnetometer, a probe, etc.). The gradient magnetic field information may be obtained by electromagnetically emulating the gradient coil when performing the system correction, or by measuring the linearity of the gradient coil directly. The system correction may be performed periodically or aperiodically, and as a result, the stored main magnetic field intensity distribution information and gradient magnetic field information can be updated.

In step 230, a first correction coefficient is obtained based on the main magnetic field intensity distribution information.

In step 250, based on one or more among the X-axis gradient magnetic field information, the Y-axis gradient magnetic field information, and the Z-axis gradient magnetic field information, one or more corresponding second correction coefficients are obtained. In some embodiments, the one or more second correction coefficients may include at least one among an X-axis correction coefficient, a Y-axis correction coefficient, and a Z-axis correction coefficient. Image distortion may be affected to different extents by the three axes, and thus the correction coefficients of the three axes may all be applied to image correction. It is also possible to ignore the effect of a certain axis or axes, and thus the correction coefficient for that axis may not be generated.

Steps 230 and 250 may be performed synchronously, and in some embodiments, the main magnetic field intensity distribution information and the gradient magnetic field information may be analyzed mathematically to obtain corresponding correction coefficients. The first correction coefficient and the second correction coefficients may be obtained and stored in the magnetic resonance system in advance, so that the same can be retrieved for image data correction when imaging the scan subject.

In step 270, based on the first correction coefficient and the one or more second correction coefficients described above, the image data obtained by means of the magnetic resonance system is corrected.

By applying the first correction coefficient, the problem of image distortion caused by the non-uniformity of the main magnetic field can be improved, while by applying the second correction coefficient, the problem of image distortion caused by gradient non-linearity can be improved.

Figure 3:
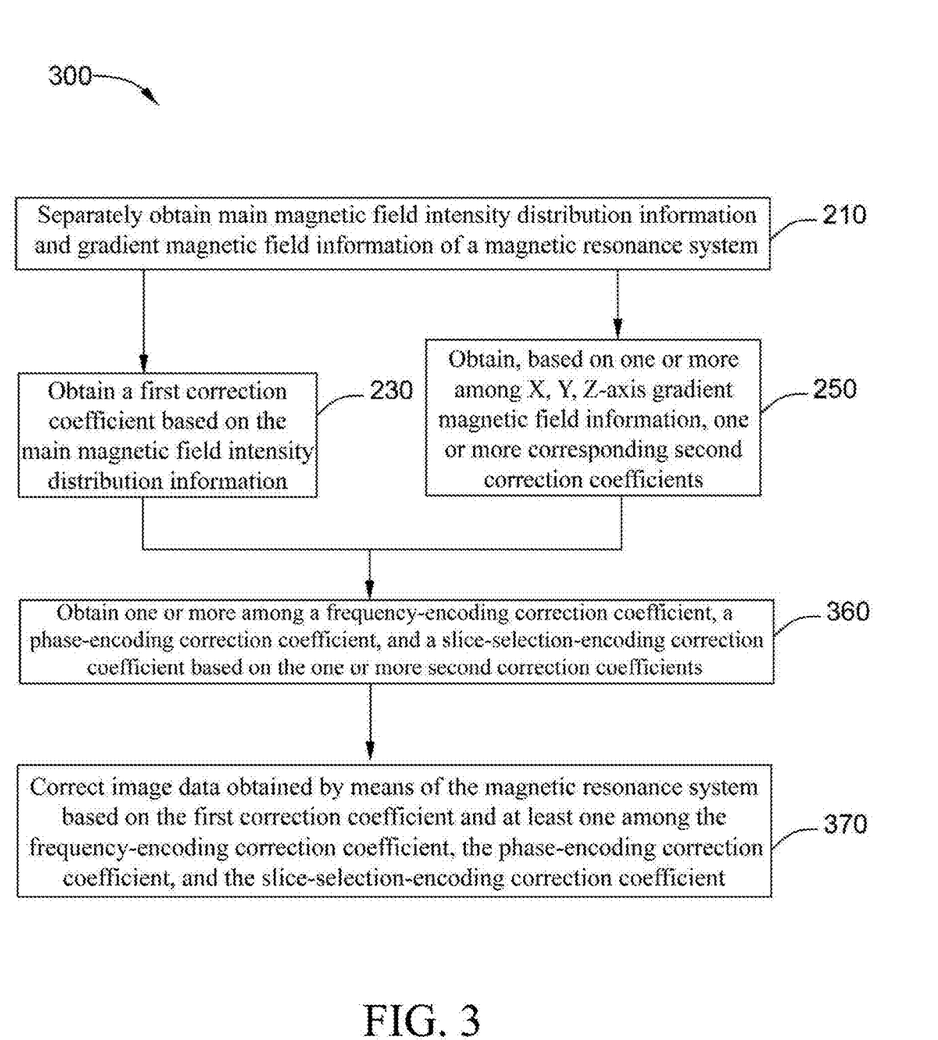
FIG. 3 illustrates a flowchart 300 of a magnetic resonance image correction method of another embodiment of the present invention.

Referring to FIG. 3, a flowchart 300 of a magnetic resonance image correction method of another embodiment of the present invention is illustrated.

In step 360, one or more among a frequency-encoding correction coefficient, a phase-encoding correction coefficient, and a slice-selection-encoding correction coefficient are obtained based on the one or more second correction coefficients. As described above, each second correction coefficient may include one or more among an X-axis correction coefficient, a Y-axis correction coefficient, and a Z-axis correction coefficient. The frequency-encoding correction coefficient described above helps to correct image distortion problems in a frequency-encoding direction. Due to the angle of slice selection or other causes, image distortion in the frequency-encoding direction may be affected by the gradient of a single axis or multiple axes, and thus the frequency-encoding correction coefficient may be related to only the X-axis correction coefficient, and may also comprise at least one among the Y-axis and Z-axis correction coefficients. The phase-encoding correction coefficient helps to correct image distortion problems in a phase-encoding direction, and likewise, the same may be related to only the Y-axis correction coefficient, and may also comprise at least one among the X-axis and Z-axis correction coefficients. The slice-selection-encoding correction coefficient helps to correct image distortion problems in a slice-selection-encoding direction, and likewise, the same may be related to only the Z-axis correction coefficient, and may also comprise at least one among the X-axis and Y-axis correction coefficients.

Further, in some examples, based on inclinations of the frequency-encoding direction, the phase-encoding direction, and the slice-selection-encoding direction relative to the X-axis, Y-axis, and Z axis, respectively that are determined during scanning, weights of the X-axis correction coefficient, Y-axis correction coefficient, and Z-axis correction coefficient related thereto may be determined.

In step 370, the image data obtained by means of the magnetic resonance system is corrected based on the first correction coefficient and at least one among the frequency-encoding correction coefficient, the phase-encoding correction coefficient, and the slice-selection-encoding correction coefficient. Specifically, image distortion caused by the non-uniformity of the main magnetic field and image distortion caused by gradient non-linearity in the frequency-encoding direction may be corrected simultaneously using both the first correction coefficient and the frequency-encoding correction coefficient; image distortion caused by the non-uniformity of the main magnetic field and image distortion caused by gradient non-linearity in the phase-encoding direction may be corrected simultaneously using both the first correction coefficient and the phase-encoding correction coefficient; and image distortion caused by the non-uniformity of the main magnetic field and image distortion caused by gradient non-linearity in the slice-selection-encoding direction may be corrected simultaneously using both the first correction coefficient and the slice-selection-encoding correction coefficient.

In some embodiments, first data fusion, second data fusion, and third data fusion may be performed on the first correction coefficient with the frequency-encoding correction coefficient, the phase-encoding correction coefficient, and the slice-selection-encoding correction coefficient, respectively, so as to respectively obtain a first image correction parameter, a second image correction parameter, and a third image correction parameter for image correction.

Therefore, in step 370, the image data obtained by means of the magnetic resonance system may be corrected based on at least one among the first image correction parameter, the second image correction parameter, and the third image correction parameter, respectively. For example, the image data correction may be performed based on the three image correction parameters described above, or only one or two of the image correction parameters may be selected, as needed, to perform the image data correction. Specifically, a magnetic resonance scan may be performed on the scan subject by means of the magnetic resonance system to obtain raw image data of the scan subject, and the first, second, and third image correction parameters may be applied to the raw image data to obtain corrected image data, such that image reconstruction can be performed based on the corrected image data, or the image correction parameters may be applied directly when performing the image reconstruction. Each image correction parameter may include a set of parameters, for correspondingly correcting data at a plurality of pixels of the image.

Figure 4:
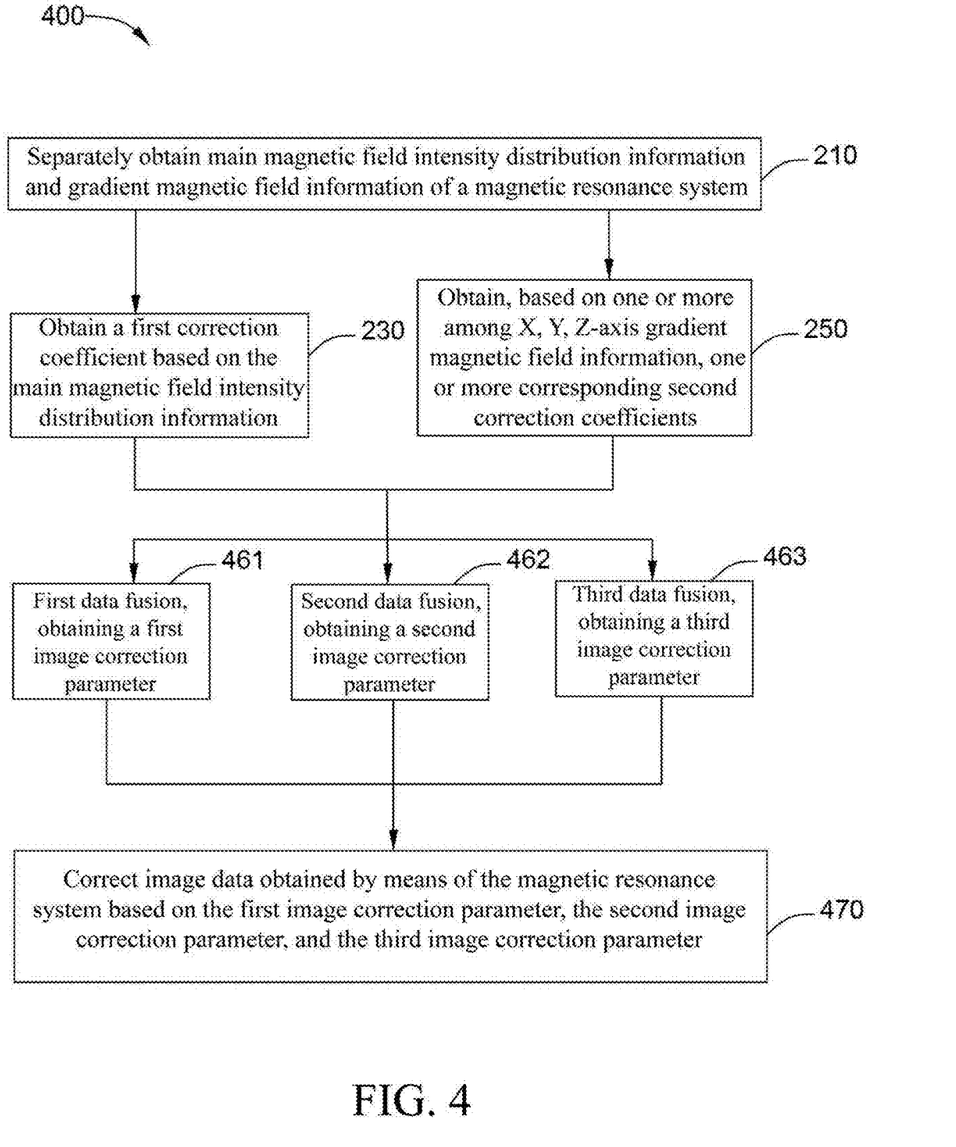
FIG. 4 illustrates a flowchart 400 of a magnetic resonance image correction method of another embodiment of the present invention.

Referring to FIG. 4, a flowchart 400 of a magnetic resonance image correction method of another embodiment of the present invention is illustrated.

In step 461, first data fusion is performed, wherein the quotient of the first correction coefficient divided by the frequency-encoding gradient employed when performing the magnetic resonance scan and the frequency-encoding correction coefficient are summed to obtain the first image correction parameter. For example, the foregoing may be represented by Formula (1).

$$Coef_x = A1*Coef_{Gx} + B1*Coef_{Gy} + C1*Coef_{Gz} + Coef_{B0}/G_{freq} \quad (1)$$

where, $A1*Coef_{Gx} + B1*Coef_{Gy} + C1*Coef_{Gz}$ is the frequency-encoding correction coefficient.

In step 462, second data fusion is performed, wherein the first correction coefficient and the phase-encoding correction coefficient are summed to obtain the second image correction parameter. For example, the foregoing may be represented by Formula (2).

$$Coef_y = A2*Coef_{Gx} + B2*Coef_{Gy} + C2*Coef_{Gz} + Coef_{B0} \quad (2)$$

where, $A2*Coef_{Gx} + B2*Coef_{Gy} + C2*Coef_{Gz}$ is the phase-encoding correction coefficient.

In step 463, third data fusion is performed, wherein the quotient of the first correction coefficient divided by the slice-selection-encoding gradient employed when performing the magnetic resonance scan and the slice-selection-encoding correction coefficient are summed to obtain the third image correction parameter. For example, the foregoing may be represented by Formula (3).

$$Coef_z = A3*Coef_{Gx} + B3*Coef_{Gy} + C3*Coef_{Gz} + Coef_{B0}/G_{slice} \quad (3)$$

where, $A3*Coef_{Gx} + B3*Coef_{Gy} + C3*Coef_{Gz}$ is the slice-selection-encoding correction coefficient.

In the above formulas, $Coef_x$, $Coef_y$, and $Coef_z$ are the first image correction parameter, the second image correction parameter, and the third image correction parameter, respectively; $Coef_{B0}$ is the first correction coefficient; $G_{freq}$, $G_{phase}$, and $G_{slice}$ are respectively the value of a frequency-encoding gradient, the value of a phase-encoding gradient, and the value of a slice-selection-encoding gradient that are employed when performing a magnetic resonance scan; $Coef_{Gx}$, $Coef_{Gy}$, and $Coef_{Gz}$ are the X-axis correction coefficient, the Y-axis correction coefficient, and the Z-axis correction coefficient, respectively; and, A1, A2, A3, B1, B2, B3, C1, C2, and C3 are weight coefficients, each one of which is greater than or equal to 0, for example, the same may be 0, 1, or other numbers.

In the present embodiment, the frequency-encoding correction coefficient $Coef_{freq}$ may include one or more among the X-axis correction coefficient $Coef_{Gx}$, the Y-axis correction coefficient $Coef_{Gy}$, and the Z-axis correction coefficient $Coef_{gz}$. The X-axis correction coefficient $Coef_{gx}$, the Y-axis correction coefficient $Coef_{Gy}$, and the Z-axis correction coefficient $Coef_{gz}$ in the frequency-encoding correction coefficient $Coef_{freq}$ may be assigned with weights A1, B1, and C1,
respectively, based on scan parameters. In one example, according to determined scan parameters, A1 may be 1, and B1 and C1 may be 0.

The phase-encoding correction coefficient $Coef_{phase}$ may include one or more among the X-axis correction coefficient $Coef_{Gx}$, the Y-axis correction coefficient $Coef_{Gy}$, and the Z-axis correction coefficient $Coef_{Gz}$. The X-axis correction coefficient $Coef_{Gx}$, the Y-axis correction coefficient $Coef_{Gy}$, and the Z-axis correction coefficient $Coef_{Gz}$ in the phase-encoding correction coefficient $Coef_{phase}$ may be assigned with weights A2, B2, and C2, respectively, based on scan parameters. In one example, according to determined scan parameters, A2 and C2 may be 0, and B2 may be 1, for example.

The slice-selection-encoding correction coefficient $Coef_{slice}$ may include one or more among the X-axis correction coefficient $Coef_{Gx}$, the Y-axis correction coefficient $Coef_{Gy}$, and the Z-axis correction coefficient $Coef_{Gz}$. The X-axis correction coefficient $Coef_{Gx}$, the Y-axis correction coefficient $Coef_{Gy}$, and the Z-axis correction coefficient $Coef_{Gz}$ in the slice-selection-encoding correction coefficient $Coef_{slice}$ may be assigned with weights A3, B3, and C3, respectively, based on scan parameters. In one example, according to determined scan parameters, A3 and B3 may be 0, and C3 may be 1, for example.

In step 470, based on the first image correction parameter, the second image correction parameter, and the third image correction parameter, the image data obtained by means of the magnetic resonance system is corrected.

In some embodiments, the main magnetic field intensity distribution information and the gradient magnetic field information may be subjected to spherical harmonic decomposition, and the first correction coefficient and each second correction coefficient include a spherical harmonic coefficient obtained after the spherical harmonic decomposition, which will be described below in view of FIG. 5.

Figure 5:
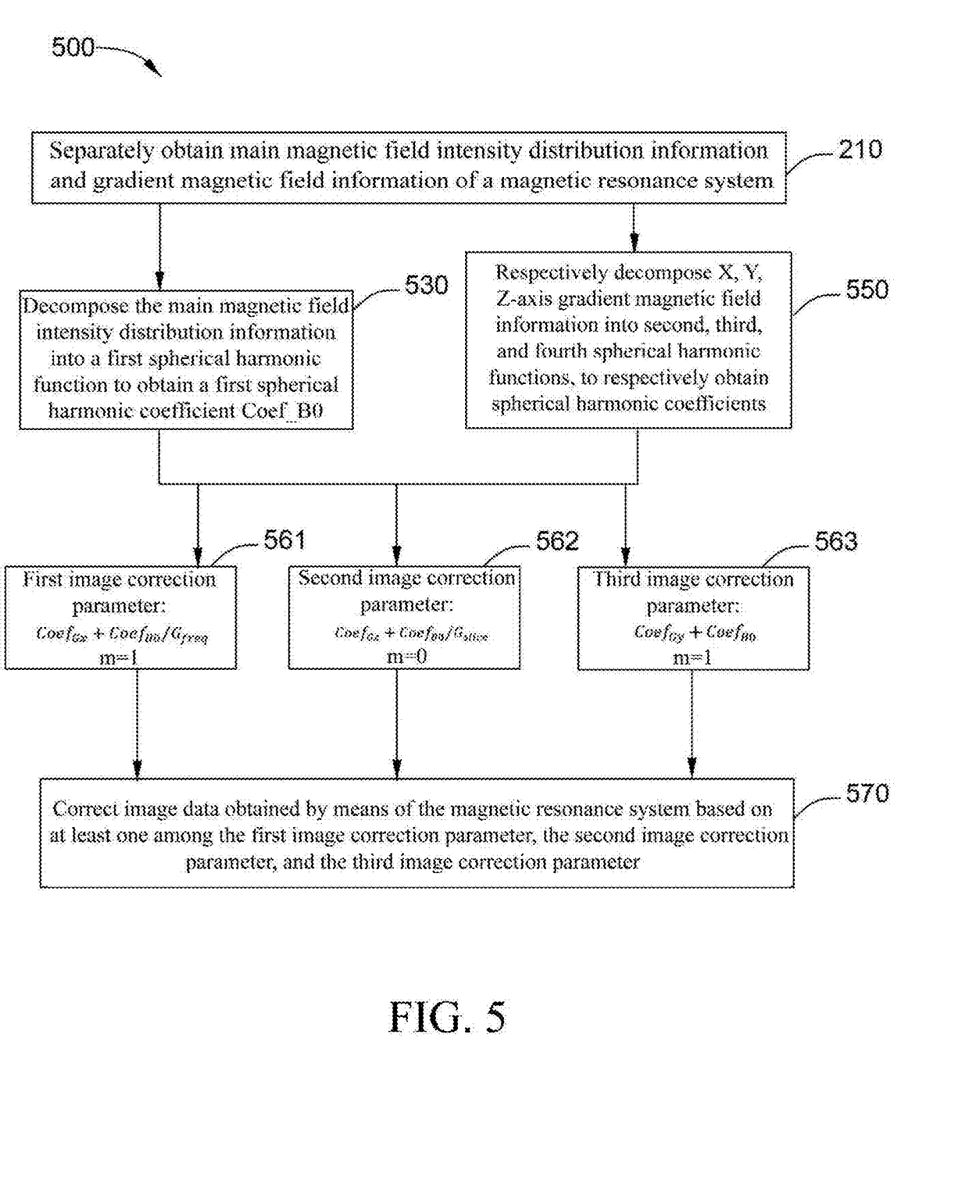
FIG. 5 illustrates a flowchart 500 of a magnetic resonance image correction method of another embodiment of the present invention.

Referring to FIG. 5, a flowchart 500 of a magnetic resonance image correction method of another embodiment of the present invention is illustrated, wherein in step 530, the main magnetic field intensity distribution information is decomposed into a first spherical harmonic function to obtain a first spherical harmonic coefficient, which may act as the first correction coefficient Coef_B0 described above.

In step 550, the X-axis gradient magnetic field information is decomposed into a second spherical harmonic function to obtain a second spherical harmonic coefficient, which may act as the X-axis correction coefficient $Coef_{Gx}$; the Y-axis gradient magnetic field information is decomposed into a third spherical harmonic function to obtain a third spherical harmonic coefficient, which may act as the Y-axis correction coefficient $Coef_{Gy}$; and the Z-axis gradient magnetic field information is decomposed into a fourth spherical harmonic function to obtain a fourth spherical harmonic coefficient, which may act as the Z-axis correction coefficient $Coef_{Gz}$.

As a known mathematical model, spherical harmonics are not repeated herein. It is understood by those skilled in the art that, spherical harmonics, for example, may be represented as $Y_L^m(\theta, \varphi)$, where l is the degree, m is the order, and $\theta$, $\varphi$ is a variable that represents direction (or angle).

In embodiments of the present invention, the first spherical harmonic function related to the main magnetic field intensity distribution information may include a plurality of (e.g., "2N+1") orders. For example, the order of the first spherical harmonic function may be "−N", "+1-N" ... "0", "0+1" ... "N−1", "N", i.e., "−N" to "N", where N is an integer. As a result, a first spherical harmonic coefficient of a corresponding order may be obtained, such as a "–N"-order spherical harmonic coefficient to an "N"-order spherical harmonic coefficient. In a simple example, N may be 1, then the order of the first spherical harmonic function may be –1, 0, and 1. The first spherical harmonic coefficient may include a first "–1"-order harmonic coefficient, a first "0"-order spherical harmonic coefficient, and a first "1"-order spherical harmonic coefficient. In other examples, N may be greater than 1. In embodiments of the present invention, a first spherical harmonic coefficient of a portion of or all orders may just be selected, as needed, as the first correction coefficient, that is, the first spherical harmonic coefficient includes one or more among a first "–N"-order spherical harmonic coefficient to a first "N"-order spherical harmonic coefficient.

As described above, the gradient coil assembly of the magnetic resonance system may include a frequency-encoding gradient coil, a slice-selection gradient coil, and a phase-encoding gradient coil. Similarly to the first spherical harmonic function described above, the second spherical harmonic function related to an X-axis gradient coil may include one or more among an "–M"-order spherical harmonic function to an "M"-order spherical harmonic function, and correspondingly, one or more among an "–M"-order spherical harmonic coefficient to an "M"-order spherical harmonic coefficient are generated; the third spherical harmonic function related to a Y-axis gradient coil may include one or more among a "–J"-order spherical harmonic function to a "J"-order spherical harmonic function, and correspondingly, one or more among a "–J"-order spherical harmonic coefficient to a "J"-order spherical harmonic coefficient are generated; and the fourth spherical harmonic function related to a Z-axis coil may also include one or more among a "–K"-order spherical harmonic function to a "K"-order spherical harmonic function, and correspondingly, one or more among a "–K"-order spherical harmonic coefficient to a "K"-order spherical harmonic coefficient are generated. M, J, and K are all integers, and N, M, J, and K may be at least partially equal (or may be completely equal), or may not be equal to one another. A second spherical harmonic coefficient, a third spherical harmonic coefficient, or a fourth spherical harmonic coefficient of a portion of or all orders can just be selected, as needed, as the X-axis correction coefficient, the Y-axis correction coefficient, and the Z-axis correction coefficient, i.e., the second correction coefficient.

In one example, when N=1, and an axial scan is performed, if the slice-selection-encoding direction is the Z-axis direction, the frequency-encoding direction is the X-axis direction, and the phase-encoding direction is the Y-axis direction, then the frequency-encoding correction coefficient may include only the X-axis correction coefficient, the phase-encoding correction coefficient may include only the Y-axis correction coefficient, and the slice-selection-encoding direction may include only the Z-axis correction coefficient.

Based on configurations of scan parameters and actual requirements of image correction, the first spherical harmonic coefficient may include a "1"-order spherical harmonic coefficient, a "0"-order spherical harmonic coefficient, and a "–1"-order spherical harmonic coefficient; the second spherical harmonic coefficient may include only a "1"-order spherical harmonic coefficient or may further include a spherical harmonic coefficient of another order; the third spherical harmonic coefficient may include only a "–1"-order spherical harmonic coefficient or may further include a spherical harmonic coefficient of another order; and the fourth spherical harmonic coefficient may include only a "0"-order spherical harmonic coefficient or may further include a spherical harmonic coefficient of another order.

Further, the first spherical harmonic function (including "–N"-order to "N"-order) may include a plurality of consecutive degrees, for example, the degree thereof may include a combination of any consecutive degrees in "2"–"H", and H is an integer greater than 2. The degree of the second, third, and fourth spherical harmonic functions may include a combination of any consecutive degrees in "2"–"H", or may be selected, according to the performance of a corresponding gradient coil, to include only an even degree (e.g., 2, 4, 6, 8 . . . ) or an odd degree (e.g., 3, 5, 7, 9 . . . ). By means of the above settings of the orders and degrees of the spherical harmonic functions, it is possible to simplify operation while enabling the obtained spherical harmonic coefficients to serve as more accurate correction coefficients. However, in order to obtain better correction results, each spherical harmonic function may have more orders or degrees.

With continued reference to FIG. 5, in step 561, the quotient of the first correction coefficient divided by the frequency-encoding gradient employed when performing the magnetic resonance scan and the frequency-encoding correction coefficient are summed to obtain the first image correction parameter, wherein the frequency-encoding correction coefficient is the X-axis correction coefficient. The foregoing may be represented by Formula (4) below:

$$\text{Coef}_x = \text{Coef}_{Gx} + \text{Coef}_{B0}/G_{freq}, m=1 \qquad (4)$$

In Formula (4), $\text{Coef}_x$ is the first image correction parameter, $\text{Coef}_{Gx}$ is the X-axis correction coefficient, which may be a spherical harmonic coefficient of a "1"-order (m=1) second spherical harmonic function, $\text{Coef}_{B0}$ is the first correction coefficient, which may be a spherical harmonic coefficient of a "1"-order first spherical harmonic function, and $G_{freq}$ is the value of the frequency-encoding gradient.

In step 562, the first correction coefficient and the Y-axis correction coefficient are summed to obtain the second image correction parameter, which may be represented by Formula (5) below:

$$\text{Coef}_y = \text{Coef}_{Gy} + \text{Coef}_{B0}, m=-1 \qquad (5)$$

In Formula (5), $\text{Coef}_y$ is the second image correction parameter, $\text{Coef}_{Gy}$ is the Y-axis correction coefficient, which may be a spherical harmonic coefficient of a "–1"-order (m=–1) third spherical harmonic function.

In step 563, the quotient of the first correction coefficient divided by the slice-selection gradient employed when performing a formal scan and the Z-axis spherical harmonic coefficient are summed to obtain the third image correction parameter, which may be represented by Formula (6) below:

$$\text{Coef}_z = \text{Coef}_{Gz} + \text{Coef}_{B0}/G_{slice}, m=0 \qquad (6)$$

In Formula (6), $\text{Coef}_z$ is the third image correction parameter, $\text{Coef}_{Gz}$ is the Z-axis correction coefficient, which may be a spherical harmonic coefficient of a "0"-order fourth spherical harmonic function, and $G_{slice}$ is the value of the slice-selection gradient.

In step 570, the image data obtained by means of the magnetic resonance system is corrected based on at least one among the first image correction parameter, the second image correction parameter, and the third image correction parameter.

The formulas in steps 561-563 are one simplified example obtained after setting the weight coefficients in Formulas (1)-(3). In other examples, Formulas (4)-(6) may be changed based on setting different weight coefficients.

Among the image correction parameters obtained in the various embodiments above, the first image correction parameter may correct pixel shift in a first direction, the second image correction parameter may correct pixel shift in a second direction, and the third image correction parameter may correct pixel shift in a third direction, such that the geometric distortion of an image is corrected. The above first direction, second direction, and third direction may correspond to the frequency-encoding direction, the phase-encoding direction, and the slice-selection-encoding direction of the magnetic resonance scan, respectively.

Figure 6:
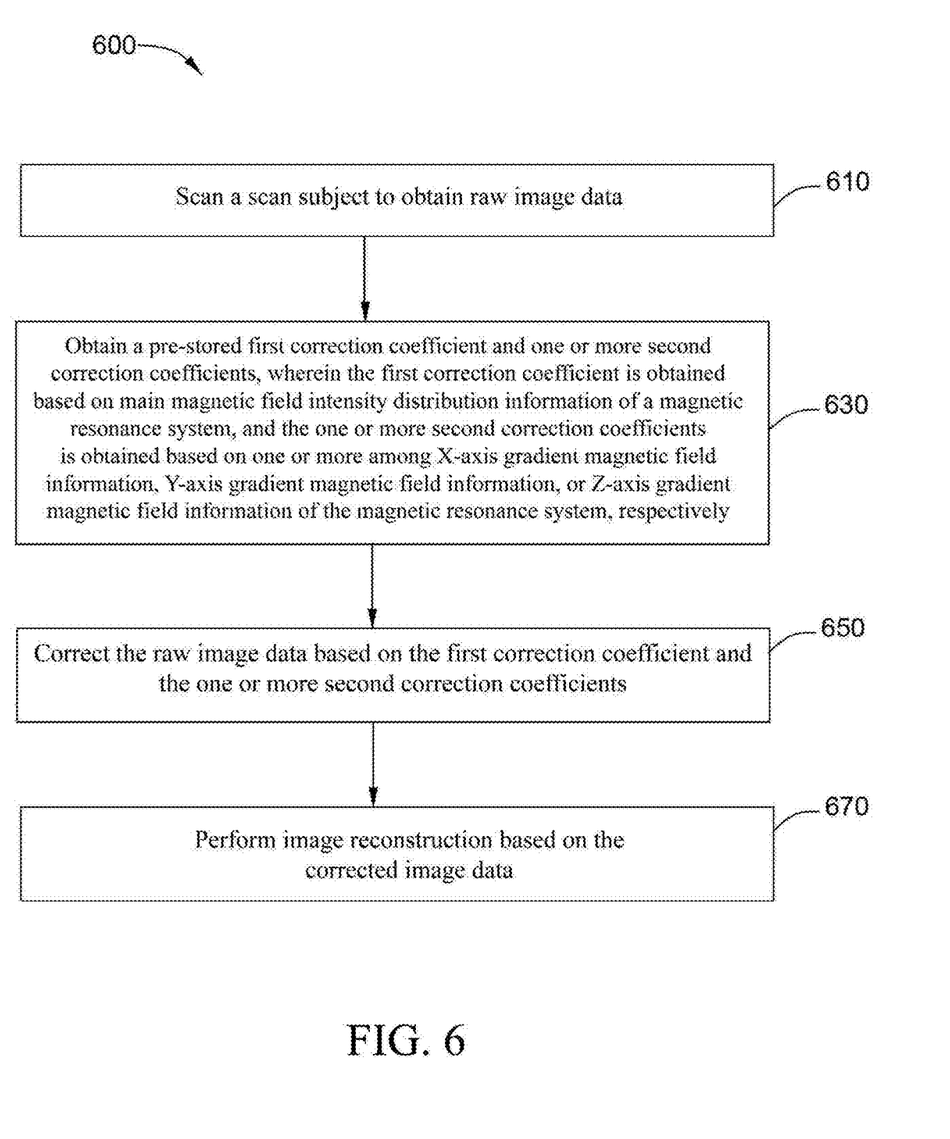
FIG. 6 is a flowchart 600 of a magnetic resonance imaging method of an embodiment of the present invention.

Referring to FIG. 6, a flowchart 600 of a magnetic resonance imaging method of an embodiment of the present invention is illustrated. In step 610, a scan subject is scanned to obtain raw image data, which may be implemented by using the magnetic resonance system as shown in FIG. 1.

In step 630, a pre-stored first correction coefficient and one or more second correction coefficients are obtained, wherein the first correction coefficient is obtained based on main magnetic field intensity distribution information of the magnetic resonance system, and the one or more second correction coefficients are obtained based on one or more of X-axis gradient magnetic field information, Y-axis gradient magnetic field information, or Z-axis gradient magnetic field information of the magnetic resonance system.

In step 650, the raw image data is corrected based on the first correction coefficient and the one or more second correction coefficients.

In step 670, image reconstruction is performed based on the corrected image data.

Embodiments of the present invention may further provide a magnetic resonance system, including a main magnet for generating a main magnetic field, a gradient coil for generating a gradient magnetic field superimposed on the main magnetic field, and a processor. The processor may be used to perform the magnetic resonance image correction method or the magnetic resonance imaging method of any of the above embodiments.

Further, the step of correcting the raw image data based on the first correction coefficient and the one or more second correction coefficients comprises: obtaining one or more among a frequency-encoding correction coefficient, a phase-encoding correction coefficient, and a slice-selection-encoding correction coefficient based on the one or more second correction coefficients; and correcting the raw image data based on the first correction coefficient and at least one among the frequency-encoding correction coefficient, the phase-encoding correction coefficient, and the slice-selection-encoding correction coefficient.

Further, the step of correcting the raw image data comprises: correcting the image data based on at least one among a first image correction parameter, a second image correction parameter, and a third image correction parameter; wherein the first image correction parameter is obtained by performing first data fusion on the first correction coefficient and the frequency-encoding correction coefficient; the second image correction parameter is obtained by performing second data fusion on the first correction coefficient and the phase-encoding correction coefficient; and the third image correction parameter is obtained by performing third data fusion on the first correction parameter and the slice-selection-encoding correction coefficient.

Further, the one or more second correction coefficients comprise an X-axis correction coefficient, a Y-axis correction coefficient, and a Z-axis correction coefficient, wherein the frequency-encoding correction coefficient, the phase-encoding correction coefficient, and the slice-selection-encoding correction coefficient comprise the X-axis correction coefficient, the Y-axis correction coefficient, and the Z-axis correction coefficient, respectively; or the frequency-encoding correction coefficient, the phase-encoding correction coefficient, and the slice-selection-encoding correction coefficient comprise at least two coefficients among the X-axis correction coefficient, the Y-axis correction coefficient, and the Z-axis correction coefficient, respectively, wherein the at least two coefficients among the frequency-encoding correction coefficient, the phase-encoding correction coefficient, or the slice-selection-encoding correction coefficient have a corresponding weight coefficient.

Further, the first data fusion, the second data fusion, and the third data fusion are performed based on Formula (1), Formula (2), and Formula (3), respectively.

Further, the main magnetic field intensity distribution information is decomposed into a first spherical harmonic function to obtain a first spherical harmonic coefficient, and the first correction coefficient comprises the first spherical harmonic coefficient; and the one or more second correction coefficients comprise one or more among a second spherical harmonic coefficient, a third spherical harmonic coefficient, and a fourth spherical harmonic coefficient, wherein the second spherical harmonic coefficient is obtained by decomposing the X-axis gradient magnetic field information into a second spherical harmonic function, the third spherical harmonic coefficient is obtained by decomposing the Y-axis gradient magnetic field information into a third spherical harmonic function, and the fourth spherical harmonic coefficient is obtained by decomposing the Z-axis gradient magnetic field information into a fourth spherical harmonic function.

Further, the first spherical harmonic coefficient comprises one or more among a "−N"-order spherical harmonic coefficient to an "N"-order spherical harmonic coefficient, the second spherical harmonic coefficient comprises one or more among a "−M"-order spherical harmonic coefficient to an "M"-order spherical harmonic coefficient, and the third spherical harmonic coefficient comprises one or more among a "−J"-order spherical harmonic coefficient to a "J"-order spherical harmonic coefficient, and the fourth spherical harmonic coefficient comprises one or more among a "−K"-order spherical harmonic coefficient to a "K"-order spherical harmonic coefficient, wherein N, M, J, and K are all integers, and N, M, J, and K are at least partially equal or are not equal to one another.

Further, the degree of the first spherical harmonic function comprises a combination of any consecutive degrees in "2"–"H"; the degree of the second spherical harmonic function comprises a combination of any consecutive degrees in "2"–"H", an even degree in "2"–"H", or an odd degree in "2"–"H"; the degree of the third spherical harmonic function comprises a combination of any consecutive degrees in "2"–"H", an even degree in "2"–"H", or an odd degree in "2"–"H"; and, the degree of the fourth spherical harmonic function comprises a combination of any consecutive degrees in "2"–"H", an even degree in "2"–"H", or an odd degree in "2"–"H"; wherein, N is an integer greater than 2.

Further, the main magnetic field intensity distribution information is obtained in a system correction stage of the magnetic resonance system. Further, the main magnetic field intensity distribution information is obtained by performing a magnetic resonance scan on a shimming phantom or by means of a magnetic field detection apparatus.

Further, the gradient magnetic field information comprises gradient linearity, which is obtained by emulating a gradient coil of the magnetic resonance system or by measuring.

In various embodiments of the present invention, by performing synchronization correction on different types of image geometric distortion, for example, fusing different types of image geometric distortion correction into the same correction model, different reasons for distortion can be comprehensively considered which, compared to conventional technical solutions, can improve different types rather than a single type of geometric distortion, enabling image aberration/distortion/warping, etc, to be reduced to a greater extent, obtaining better image quality, with less operation.

For geometric distortion caused by the non-uniformity of the main magnetic field, rather than completely depending on the uniformity of the main magnetic field or the shimming effect, distortion is further corrected, so that the distortion is reduced further, and at the same time, the strict performance requirements of the main magnet are eliminated, reducing design and manufacturing costs.

In addition, the first correction coefficient and second correction used in image correction may be obtained and stored in advance, which facilitates immediately obtaining correction parameters, and can improve the efficiency of image correction.

By adopting the embodiments of the present invention, image distortion under different scan parameters may be improved, and it is found that, the farther away from the isocenter (ISO) of the magnet, the more obvious the improvement effect on distortion.

Figure 7:
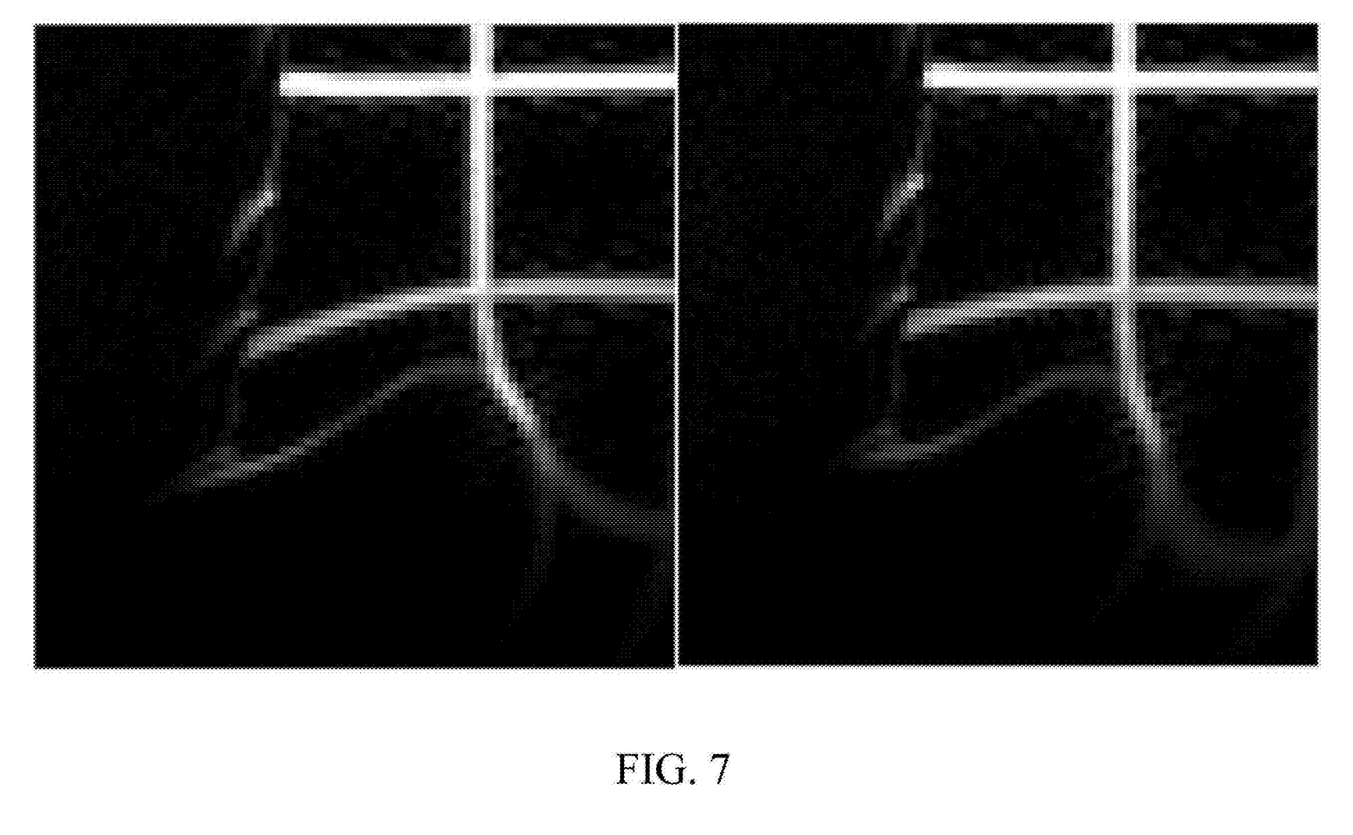
FIGS. 7, 8, and 9 illustrate comparison of images obtained using the technical solution of the present invention and a conventional technical solution.
Figure 8:
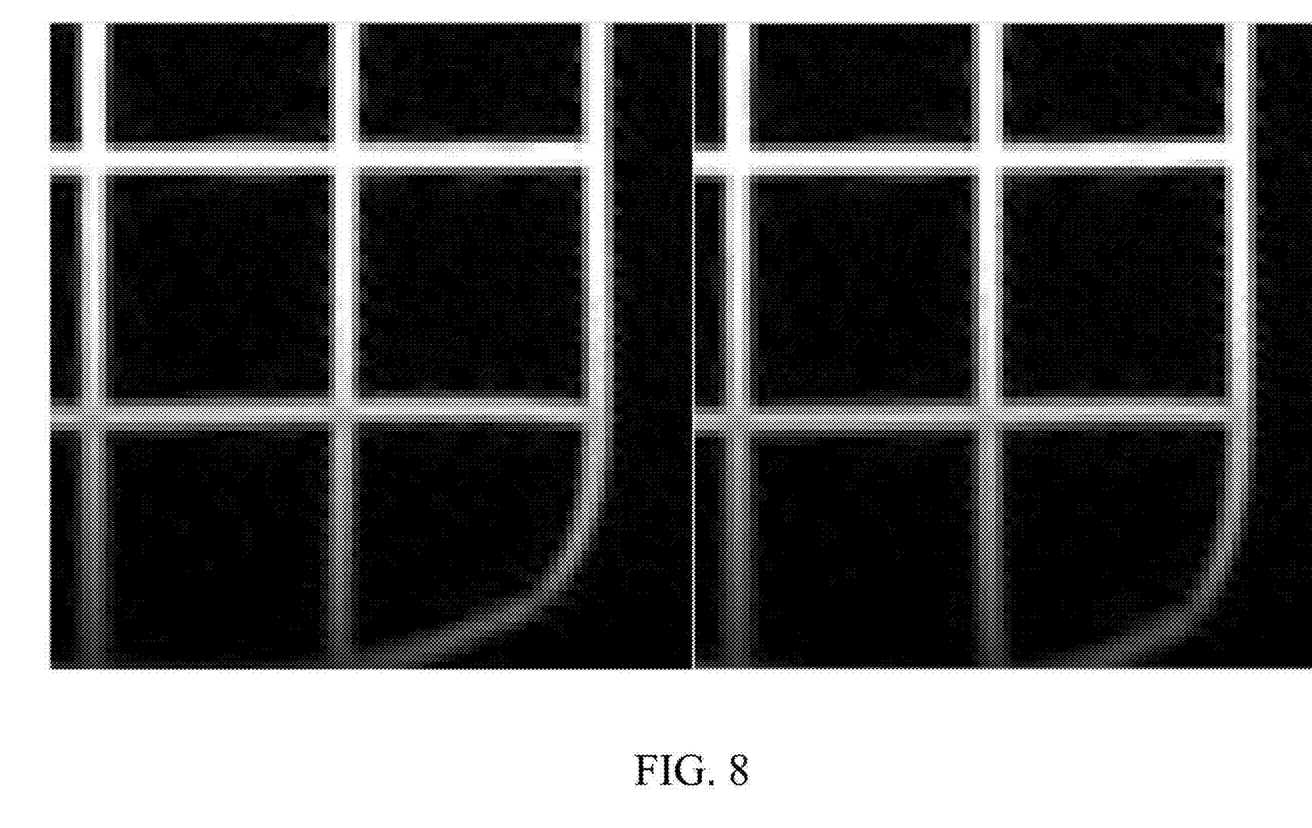
Figure 9:
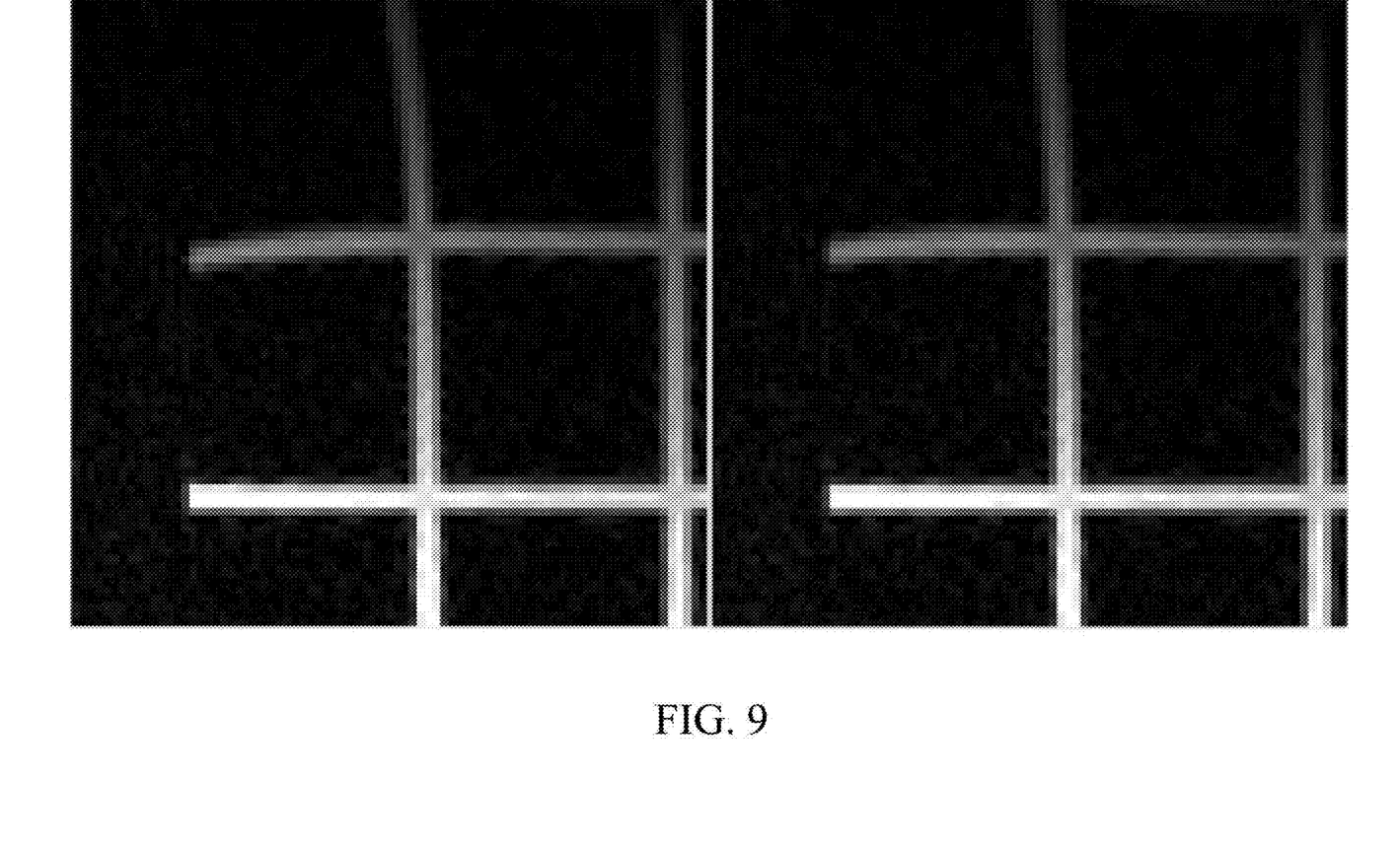

FIG. 7 shows an image obtained using the technical solution of the present invention (as shown on the left side of FIG. 7) and an image obtained using a conventional technical solution (as shown on the left side of FIG. 7), at a receiving bandwidth of 4 kHz. FIG. 8 shows an image obtained using the technical solution of the present invention (as shown on the left side of FIG. 8) and an image obtained using a conventional technical solution (as shown on the right side of FIG. 8), at a receiving bandwidth of 8 kHz. FIG. 9 shows an image obtained using the technical solution of the present invention (as shown on the left side of FIG. 9) and an image obtained using a traditional technical solution (as shown on the right side of FIG. 9), at a receiving bandwidth of 16 kHz. As can be seen from FIGS. 7-9, at different receiving bandwidths, the images obtained using the technical solution of the present invention, compared with using the conventional technical solution, are improved with respect to the geometric distortion problem.

While the present invention has been described in detail with reference to specific embodiments, it would be understood by those skilled in the art that many modifications and variations can be made to the present invention. Therefore, it should be understood that the claims are intended to cover all such modifications and variations within the true spirit and scope of the present invention.

The invention claimed is:

1. A magnetic resonance image correction method, comprising:
    separately obtaining main magnetic field intensity distribution information and gradient magnetic field information of a magnetic resonance system, the gradient magnetic field information comprising one or more among X-axis gradient magnetic field information, Y-axis gradient magnetic field information, and Z-axis gradient magnetic field information;
    obtaining a first correction coefficient based on the main magnetic field intensity distribution information;
    obtaining, based on one or more among the X-axis gradient magnetic field information, the Y-axis gradient magnetic field information, and the Z-axis gradient magnetic field information, one or more corresponding second correction coefficients; and
    correcting image data obtained by means of the magnetic resonance system based on the first correction coefficient and the one or more second correction coefficients.

2. The method according to claim 1, wherein the step of correcting image data obtained by means of the magnetic resonance system comprises:
    obtaining one or more among a frequency-encoding correction coefficient, a phase-encoding correction coefficient, and a slice-selection encoding correction coefficient based on the one or more second correction coefficients; and
    correcting the image data obtained by means of the magnetic resonance system based on the first correction coefficient and at least one of among the frequency-encoding correction coefficient, the phase-encoding correction coefficient, and the slice-selection-encoding correction coefficient.

3. The method according to claim 2, wherein the step of correcting the image data obtained by means of the magnetic resonance system comprises:
    correcting the image data based on at least one among a first image correction parameter, a second image correction parameter, and a third image correction parameter;
    wherein, the first image correction parameter is obtained by performing first data fusion on the first correction coefficient and the frequency-encoding correction coefficient; the second image correction parameter is obtained by performing second data fusion on the first correction coefficient and the phase-encoding correction coefficient; and the third image correction parameter is obtained by performing third data fusion on the first correction coefficient and the slice-selection encoding correction coefficient.

4. The method according to claim 3, wherein the one or more second correction coefficients comprise an X-axis correction coefficient, a Y-axis correction coefficient, and a Z-axis correction coefficient, wherein
    the frequency-encoding correction coefficient, the phase-encoding correction coefficient, and the slice-selection encoding correction coefficient comprise the X-axis correction coefficient, the Y-axis correction coefficient, and the Z-axis correction coefficient, respectively; or
    the frequency-encoding correction coefficient, the phase-encoding correction coefficient, and the slice-selection encoding correction coefficient comprise at least two coefficients among the X-axis correction coefficient, the Y-axis correction coefficient, and the Z-axis correction coefficient, respectively, wherein the at least two coefficients among the frequency-encoding correction coefficient, the phase-encoding correction coefficient, or the slice-selection encoding correction coefficient have a corresponding weight coefficient.

5. The method according to claim 4, wherein
    the first data fusion, the second data fusion, and the third data fusion are performed based on a first formula, a second formula, and a third formula, respectively;
    the first formula being:

$$Coef_x = A1*Coef_{Gx} + B1*Coef_{Gy} + C1*Coef_{Gz} + Coef_{B0}/G_{freq}$$

the second formula being:

$$Coef_y = A2*Coef_{Gx} + B2*Coef_{Gy} + C2*Coef_{Gz} + Coef_{B0}$$

the third formula being:

$$Coef_z = A3*Coef_{Gx} + B3*Coef_{Gy} + C3*Coef_{Gz} + Coef_{B0}|G_{slice}$$

wherein $Coef_x$, $Coef_y$, and $Coef_z$ are the first image correction parameter, the second image correction parameter, and the third image correction parameter, respectively; $Coef_{B0}$ is the first correction coefficient; $G_{freq}$, $G_{phase}$, and $G_{slice}$ are respectively the value of a frequency-encoding gradient, the value of a phase-encoding gradient, and the value of a slice-selection encoding gradient that are employed when performing a magnetic resonance scan; $Coef_{Gx}$, $Coef_{Gy}$, and $Coef_{Gz}$ are the X-axis correction coefficient, the Y-axis correction coefficient, and the Z-axis correction coefficient, respectively; and, A1, A2, A3, B1, B2, B3, C1, C2, and C3 are each greater than or equal to 0.

6. The method according to claim 1, wherein the main magnetic field intensity distribution information is decomposed into a first spherical harmonic function to obtain a first spherical harmonic coefficient, and the first correction coefficient comprises the first spherical harmonic coefficient; and the one or more second correction coefficients comprise one or more among a second spherical harmonic coefficient, a third spherical harmonic coefficient, and a fourth spherical harmonic coefficient, wherein the second spherical harmonic coefficient is obtained by decomposing the X-axis gradient magnetic field information into a second spherical harmonic function, the third spherical harmonic coefficient is obtained by decomposing the Y-axis gradient magnetic field information into a third spherical harmonic function, and the fourth spherical harmonic coefficient is obtained by decomposing the Z-axis gradient magnetic field information into a fourth spherical harmonic function.

7. The method according to claim 6, wherein the first spherical harmonic coefficient comprises one or more among a "−N"-order spherical harmonic coefficient to an "N"-order spherical harmonic coefficient, the second spherical harmonic coefficient comprises one or more among a "−M"-order spherical harmonic coefficient to an "M"-order spherical harmonic coefficient, the third spherical harmonic coefficient comprises one or more among a "−J"-order spherical harmonic coefficient to a "J"-order spherical harmonic coefficient, and the fourth spherical harmonic coefficient comprises one or more among a "−K"-order spherical harmonic coefficient to a "K"-order spherical harmonic coefficient, wherein N, M, J, and K are all integers, and N, M, J, and K are at least partially equal or are not equal to each other.

8. The method according to claim 7, wherein
the degree of the first spherical harmonic function comprises a combination of any consecutive degrees in "2"–"H";
the degree of the second spherical harmonic function comprises a combination of any consecutive degrees in "2"–"H", an even degree in "2"–"H", or an odd degree in "2"–"H";
the degree of the third spherical harmonic function comprises a combination of any consecutive degrees in "2"–"H", an even degree in "2"–"H", or an odd degree in "2"–"H"; and the degree of the fourth spherical harmonic function comprises a combination of any consecutive degrees in "2"–"H", an even degree in "2"–"H", or an odd degree in "2"–"H";
wherein H is an integer greater than 2.

9. The method according to claim 1, wherein the main magnetic field intensity distribution information is obtained in a system correction stage of the magnetic resonance system.

10. The method according to claim 1, wherein the main magnetic field intensity distribution information is obtained by performing a magnetic resonance scan on a shimming phantom or by means of a magnetic field detection apparatus.

11. The method according to claim 1, wherein the gradient magnetic field information comprises gradient linearity, which is obtained by emulating a gradient coil of the magnetic resonance system or by measuring.

12. A magnetic resonance imaging method, comprising:
scanning a scan subject by means of a magnetic resonance system to obtain raw image data;
obtaining a pre-stored first correction coefficient and one or more second correction coefficients, the first correction coefficient being obtained based on main magnetic field intensity distribution information of the magnetic resonance system, and the one or more second correction coefficients being obtained based on one or more among X-axis gradient magnetic field information, Y-axis gradient magnetic field information, or Z-axis gradient magnetic field information of the magnetic resonance system, respectively;
correcting the raw image data based on the first correction coefficient and the one or more second correction coefficients; and
performing image reconstruction based on the corrected image data.

13. The method according to claim 12, wherein the step of correcting the raw image data based on the first correction coefficient and the one or more second correction coefficients comprises:
obtaining one or more among a frequency-encoding correction coefficient, a phase-encoding correction coefficient, and a slice-selection encoding correction coefficient based on the one or more second correction coefficients; and
correcting the raw image data based on the first correction coefficient and at least one among the frequency-encoding correction coefficient, the phase-encoding correction coefficient, and the slice-selection encoding correction coefficient.

14. The method according to claim 13, wherein the step of correcting the raw image data comprises:
correcting the image data based on at least one among a first image correction parameter, a second image correction parameter, and a third image correction parameter;
wherein the first image correction parameter is obtained by performing first data fusion on the first correction coefficient and the frequency-encoding correction coefficient; the second image correction parameter is obtained by performing second data fusion on the first correction coefficient and the phase-encoding correction coefficient; and the third image correction parameter is obtained by performing third data fusion on the first correction parameter and the slice-selection encoding correction coefficient.

15. The method according to claim 14, wherein the one or more second correction coefficients comprise an X-axis correction coefficient, a Y-axis correction coefficient, and a Z-axis correction coefficient, wherein the frequency-encoding correction coefficient, the phase-encoding correction coefficient, and the slice-selection encoding correction coefficient comprise the X-axis correction coefficient, the Y-axis correction coefficient, and the Z-axis correction coefficient, respectively; or the frequency-encoding correction coefficient, the phase-encoding correction coefficient, and the slice-selection encoding correction coefficient comprise at least two coefficients among the X-axis correction coefficient, the Y-axis correction coefficient, and the Z-axis correction coefficient, respectively, wherein the at least two coefficients among the frequency-encoding correction coefficient, the phase-encoding correction coefficient, or the slice-selection encoding correction coefficient have a corresponding weight coefficient.

16. The method according to claim 15, wherein the first data fusion, the second data fusion, and the third data fusion are performed based on a first formula, a second formula, and a third formula, respectively;

the first formula being:

$$\text{Coef}_x = A1 * \text{Coef}_{Gx} + B1 * \text{Coef}_{Gy} + C1 * \text{Coef}_{Gz} + \text{Coef}_{B0} / G_{freq}$$

the second formula being:

$$\text{Coef}_y = A2 * \text{Coef}_{Gx} + B2 * \text{Coef}_{Gy} + C2 * \text{Coef}_{Gz} + \text{Coef}_{B0}$$

the third formula being:

$$\text{Coef}_z = A3 * \text{Coef}_{Gx} + B3 * \text{Coef}_{Gy} + C3 * \text{Coef}_{Gz} + \text{Coef}_{B0} / G_{slice}$$

wherein $\text{Coef}_x$, $\text{Coef}_y$, and $\text{Coef}_z$ are the first image correction parameter, the second image correction parameter, and the third image correction parameter, respectively; $\text{Coef}_{B0}$ is the first correction coefficient; $G_{freq}$, $G_{phase}$, and $G_{slice}$ are the value of a frequency-encoding gradient, the value of a phase-encoding gradient, and the value of a slice-selection encoding gradient, respectively, which are employed when performing a magnetic resonance scan;

$\text{Coef}_{Gx}$, $\text{Coef}_{Gy}$, and $\text{Coef}_{Gz}$ are the X-axis correction coefficient, the Y-axis correction coefficient, and the Z-axis correction coefficient, respectively; and, A1, A2, A3, B1, B2, B3, C1, C2, and C3 are each greater than or equal to 0.

17. The method according to claim 12, wherein the main magnetic field intensity distribution information is decomposed into a first spherical harmonic function to obtain a first spherical harmonic coefficient, and the first correction coefficient comprises the first spherical harmonic coefficient; and the one or more second correction coefficients comprise one or more among a second spherical harmonic coefficient, a third spherical harmonic coefficient, and a fourth spherical harmonic coefficient, wherein the second spherical harmonic coefficient is obtained by decomposing the X-axis gradient magnetic field information into a second spherical harmonic function, the third spherical harmonic coefficient is obtained by decomposing the Y-axis gradient magnetic field information into a third spherical harmonic function, and the fourth spherical harmonic coefficient is obtained by decomposing the Z-axis gradient magnetic field information into a fourth spherical harmonic function.

18. A magnetic resonance system, comprising:

a main magnet for generating a main magnetic field;

a gradient coil for generating a gradient magnetic field superimposed on the main magnetic field; and, a processor for performing the magnetic resonance image correction method according to claim 1.

* * * * *